No. 817,323.　　　　　　　　　　　　　　　PATENTED APR. 10, 1906.
G. W. JOHNSON.
HORSESHOE.
APPLICATION FILED APR. 18, 1904.
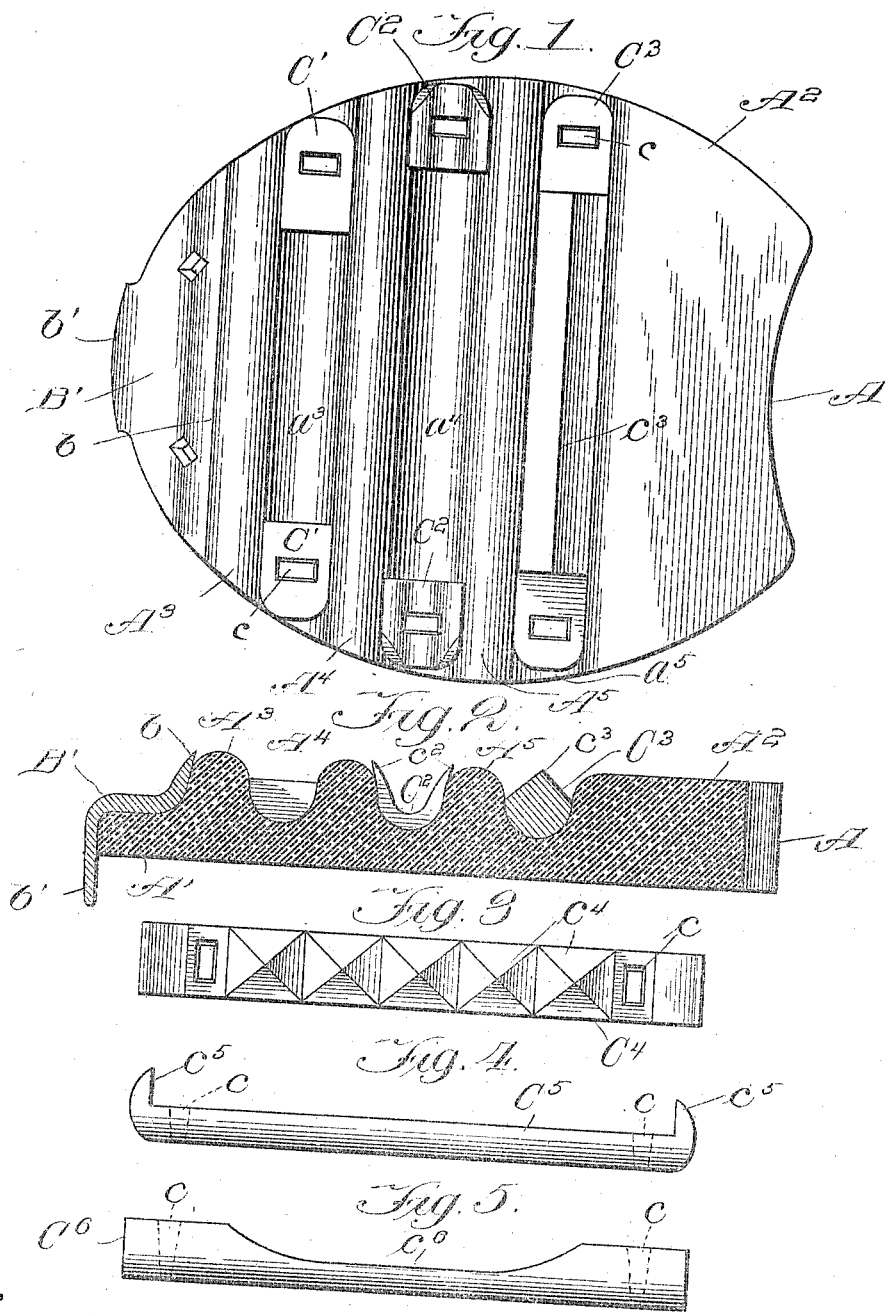

UNITED STATES PATENT OFFICE.

GEORGE W. JOHNSON, OF CHICAGO, ILLINOIS.

HORSESHOE.

No. 817,323.	Specification of Letters Patent.	Patented April 10, 1906.

Application filed April 18, 1904. Serial No. 203,557.

*To all whom it may concern:*

Be it known that I, GEORGE W. JOHNSON, a citizen of the United States, residing at Chicago, county of Cook, State of Illinois, have invented a certain new and useful Improvement in Horseshoes; and I declare the following to be a full, clear, and exact description of the invention, such as will enable others skilled in the art to which it pertains to make and use the same, reference being had to the accompanying drawings, which form a part of this specification.

My invention relates in general to horseshoes, and more particularly to a composite shoe comprising a resilient pad and metallic washers through which the nails extend.

It is well known that there are a number of objections to the usual metallic horseshoe, some of which are due to the fact that the shoe offers only a limited bearing-surface and leaves the center of the hoof exposed to injury by picking up stones, nails, or other sharp objects and in winter facilitates the forming of balls of snow within the shoe. The absence of a central bearing-surface also produces contraction of the heel, while the toe-calk strains the flexor tendons and the ligaments and increases the tendency to stumble. Other objections to the usual construction of horseshoes are that the calks catch in slots or crevices and pull off the shoe, while the concussion on hard pavements, due to lack of resiliency, often produces lameness.

The primary object of my invention is to produce a horseshoe which will avoid the objections above mentioned, which may be readily fitted to any size of hoof, and which will be resilient and light in weight and adapted for use on all conditions of pavements.

A further object of my invention is to produce a horseshoe which will be comparatively simple in construction, inexpensive in manufacture, and efficient in use.

My invention, generally described, consists in a horseshoe comprising a transversely-corrugated resilient pad of a size to completely cover the under surface of the hoof and metallic washers through which the nails pass located within the grooves of the corrugations.

My invention will be more fully described hereinafter with reference to the accompanying drawings, in which the same is illustrated as embodied in a convenient and practical form, and in which—

Figure 1 is a plan view of the under surface of the shoe; Fig. 2, a central sectional view, and Figs. 3, 4, and 5 plan views of modified forms of the washers.

Similar reference characters are used to designate similar parts in the several figures of the drawings.

Reference-letter A designates a resilient pad of a size to completely cover the under surface of the hoof of a horse. $A^2$ designates the heel portion of the pad, while A' indicates the toe, which is cut away to substantially half of the thickness of the heel. Intermediate of the heel and toe portions of the pad are corrugations composed of the ribs $A^3$, $A^4$, and $A^5$, between which are the grooves $a^3$, $a^4$, and $a^5$.

The material of which the pad is formed is resilient and preferably a composition of rubber, so that an even bearing is formed throughout the under surface of the hoof and the concussion due to the impact of the hoof against the pavement dissipated.

The pad is securely fastened to the hoof by nails which pass through metallic washers located in the grooves of the corrugations. Such washers may be of various forms and may be either of a less depth than the ribs of the corrugations or of substantially the same depth, so as to engage the pavement to prevent slipping.

C' C' designate washers of less thickness than the depth of the grooves and of a contour to closely fit against adjacent ridges. The washers C' are provided with openings $c$, through which the nails are driven.

In lieu of providing two washers within the groove of each corrugation the two washers may be integrally connected, as shown in Fig. 5, where $C^6$ indicates the washers through holes $c$, in which nails are passed, while $c^6$ designates the portion for connecting the washers.

When the pavements are in good condition and there is no danger of slipping, washers, such as C' or $C^6$, are preferably employed, whereas washers having sharp projections are preferably used when the pavements are in a slippery condition. $C^2$ $C^2$ designate U-shaped washers having projections $c^2$ of a length substantially equal to the depth of the grooves between the corrugations. $c$ represents the holes through which the nails are driven.

In lieu of locating separate washers $C^2$ in each groove bars, such as $C^3$, $C^4$, or $C^5$, may be employed. Each of such bars is provided with holes adjacent its ends, through which the nails are driven, and is provided with sharp edges or projections either intermediate of the nail-holes, as shown at $C^3$ and $C^4$, or the portion between the nail-holes may be reduced and sharp projections $c^5$ provided at the ends, as shown in Fig. 4.

While I have shown the bar $C^3$ provided with a continuous sharp edge $c^3$ and the bar $C^4$ with a series of points in the form of pyramids, yet it is obvious that other projecting points or edges may be provided.

B designates a metallic plate seated beneath the reduced toe portion $A'$ of the pad, which is preferably provided with a sharp edge $b$ of substantially the height of the adjoining rib $A^3$. The plate B may also be provided with an extension $b'$ to serve as a toe-clip to extend upwardly and overlie the adjacent portion of the hoof. The plate B is provided with holes through which the nails are driven, so that the plate serves as a washer to prevent the pad from tearing off of the hoof.

It is obvious that my improved shoe may be readily fitted to any size of hoof by trimming the outer edge thereof, or if it is desired to increase the bearing-surface of the hoof the pad may be allowed to project beyond the edge thereof. The pad preferably completely covers the under surface of the hoof; but should it be so desired an opening may be cut threrethrough to permit ventilation. When the pad has been trimmed to the desired size, it is secured to the hoof by locating washers within the grooves of the corrugations and driving nails through the washers into the hoof. The toe-plate is also secured by driving nails through the holes thereof, so that the pad is securely fastened to the hoof. When the condition of the pavement is slippery, washers with sharp projecting edges or points are employed, so that they perform the double function of serving to prevent the tearing of the pad over the nails and to avoid any danger of the horse slipping.

From the foregoing description it will be observed that I have invented an improved horseshoe which through its resiliency renders the travel of the horse practically noiseless and so reduces the concussion as to avoid any danger of producing lameness. It will also be noted that the pad entirely covers the under surface of the hoof, thereby preventing contraction of the heel and avoiding injury of the hoof by contact with stones or sharp objects. The cut-away toe portion prevents stumbling and reduces the strain on the tendons, while the absence of calks obviates any danger of the shoe being torn off through engagement of the calks with grooves or crevices.

It is obvious that the positions of the washers with respect to the edges of the pad may be varied, thereby permitting the nails to be driven deep or shallow, according to the condition of the hoof at the point where the nail is to be driven. The weight of the washers may also be varied, thereby so balancing the weight of the hoof as to correct any tendency on the part of the horse to throw his hoofs to either side. The cut-away toe of the shoe also performs the additional function of lessening the danger of interfering or forging, as the absence of a toe-calk permits the front hoofs to be more quickly lifted and thereby removed from the path of the rear hoofs.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. A horseshoe comprising a resilient pad the toe of which is of less thickness than the heel portion, and a metallic toe-plate comprising a horizontal flange through which securing-nails pass and a vertical flange projecting flush with the heel portion.

2. In a horseshoe, the combination with a transversely-corrugated resilient pad, the toe portion of which is of less thickness than the heel, and a metallic toe-plate comprising a horizontal flange through which securing-nails pass and a vertical flange projecting flush with the ribs of the corrugations.

3. A horseshoe comprising a resilient pad the toe of which is of less thickness than the heel portion, washers on the under surface of the pad having holes through which the nails pass, and a toe-plate through which the securing-nails pass.

4. In a horseshoe, the combination with a transversely-corrugated resilient pad, the toe portion of which is of less thickness than the heel, of metallic washers located within the grooves of the corrugations through which securing-nails pass, and a metallic toe-plate through which securing-nails pass.

In testimony whereof I sign this specification in the presence of two witnesses.

GEORGE W. JOHNSON.

Witnesses:
GEO. L. WILKINSON,
CLARA C. CUNNINGHAM.